(12) United States Patent
Chen

(10) Patent No.: US 8,659,277 B2
(45) Date of Patent: Feb. 25, 2014

(54) CURRENT PROVIDING METHOD AND CURRENT PROVIDING SYSTEM

(75) Inventor: Shih-Chieh Chen, Yilan County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 135 days.

(21) Appl. No.: 13/437,002

(22) Filed: Apr. 2, 2012

(65) Prior Publication Data

US 2012/0286754 A1    Nov. 15, 2012

(30) Foreign Application Priority Data

May 11, 2011  (TW) .............................. 100116466 A

(51) Int. Cl.
 *G05F 1/56* (2006.01)
(52) U.S. Cl.
 USPC ............ 323/282; 323/284; 323/285; 323/286
(58) Field of Classification Search
 USPC .................. 323/282, 284, 285, 286
 See application file for complete search history.

(56) References Cited

U.S. PATENT DOCUMENTS

| 6,433,525 | B2* | 8/2002 | Muratov et al. | 323/282 |
|---|---|---|---|---|
| 6,621,256 | B2* | 9/2003 | Muratov et al. | 323/282 |
| 7,541,795 | B1* | 6/2009 | Smith et al. | 323/285 |
| 7,679,346 | B2* | 3/2010 | Lin et al. | 323/282 |
| 8,067,929 | B2* | 11/2011 | Huang et al. | 323/284 |
| 8,350,543 | B2* | 1/2013 | Loikkanen et al. | 323/259 |
| 2002/0158613 | A1* | 10/2002 | Muratov et al. | 323/284 |
| 2006/0132110 | A1* | 6/2006 | Tang | 323/282 |
| 2009/0218998 | A1* | 9/2009 | Huang et al. | 323/282 |
| 2012/0119715 | A1* | 5/2012 | Loikkanen et al. | 323/235 |

* cited by examiner

*Primary Examiner* — Bao Q Vu
(74) *Attorney, Agent, or Firm* — Winston Hsu; Scott Margo

(57) ABSTRACT

A current providing method utilized to a power supplying circuit, which provides an output current to a loading. The current providing method comprising: detecting if a current value of the output current is larger than a threshold current value; computing a number that the current value of the output current is larger than the threshold current value; determining if the number is larger or equal to a predetermined number; and controlling the power supplying circuit to decrease the output current to a predetermined current value if the number is larger or equal to the predetermined number.

16 Claims, 5 Drawing Sheets

US 8,659,277 B2

CURRENT PROVIDING METHOD AND CURRENT PROVIDING SYSTEM

BACKGROUND OF THE INVENTION

1. Field of the Invention

The present application relates to a current providing method and a current providing system, and particularly relates to a current providing method counting a number that the current is over a threshold current value and a current providing sys

2. Description of the Prior Art

FIG. 1 is a prior art circuit diagram, which utilizes a power providing circuit 101 to provide an output current to a loading 105. The power providing circuit 101 indicates every kind of circuit that can provide a stable voltage or current to the loading 105 (for example, a switching regulator that can provide a stable voltage). In the circuit diagram shown in FIG. 1, the power providing circuit 101 provides an output current $I_{out}$ to the loading 105. The current sensing circuit 103 can sense a value of the output current $I_{out}$, and transmits the detecting value to the detecting circuit 107. After that, the detecting circuit 107 transmits the control signal CS according to detected current value, to adjust the output current $I_{out}$, such that the output current $I_{out}$ can be adjusted to a suitable value corresponding to the loading 105.

However, if the loading value changes, the output current $I_{out}$ may need to be adjusted to a value larger than a maximum threshold current that the power supplying circuit 101 can provide. That is, the loading 105 will over drain current from the power supplying circuit 101. In such case, the power supplying circuit 101 will be turned off to prevent it from broken. However, the detecting circuit 107 may misjudge due to noise or other reasons. In this case, the output current $I_{out}$ will not be adjusted to a max threshold current, such that the power supplying circuit 101 will not be affected. However, the power supplying circuit 101 will be turned off due to the misjudging of the detecting circuit 107. The normal operation of the whole will be affect.

SUMMARY OF THE INVENTION

Therefore, one objective of the present invention is to provide a mechanism that can avoid that the output current is misjudged, such that the output current can be decreased at the correct timing to maintain the normal operation of the circuit.

One embodiment of the present application is to provide a current providing method utilized to a power supplying circuit, which provides an output current to a loading. The current providing method comprising: detecting if a current value of the output current is larger than a threshold current value; computing a number that the current value of the output current is larger than the threshold current value; determining if the number is larger or equal to a predetermined number; and controlling the power supplying circuit to decrease the output current to a predetermined current value if the number is larger or equal to the predetermined number.

Another embodiment of the present application discloses a current providing system, comprising: a power supplying circuit, for providing an output current to a loading; a current sensing circuit, for detecting a current value of the output current; a detecting circuit, for determining if a current value of the output current is larger than a threshold current value; a number counting circuit, for computing a number that the current value of the output current is larger than the threshold current value; and a controller, for determining if the number is larger or equal to a predetermined number and for controlling the power supplying circuit to decrease the output current to a predetermined current value if the number is larger or equal to the predetermined number.

In view of above-mentioned embodiment, the issue of wrongly turning off the power supplying circuit in the prior art can be avoided. Additionally, the accurate timing for turning off the power supplying circuit can be acquired via dynamically changing the predetermined counter value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
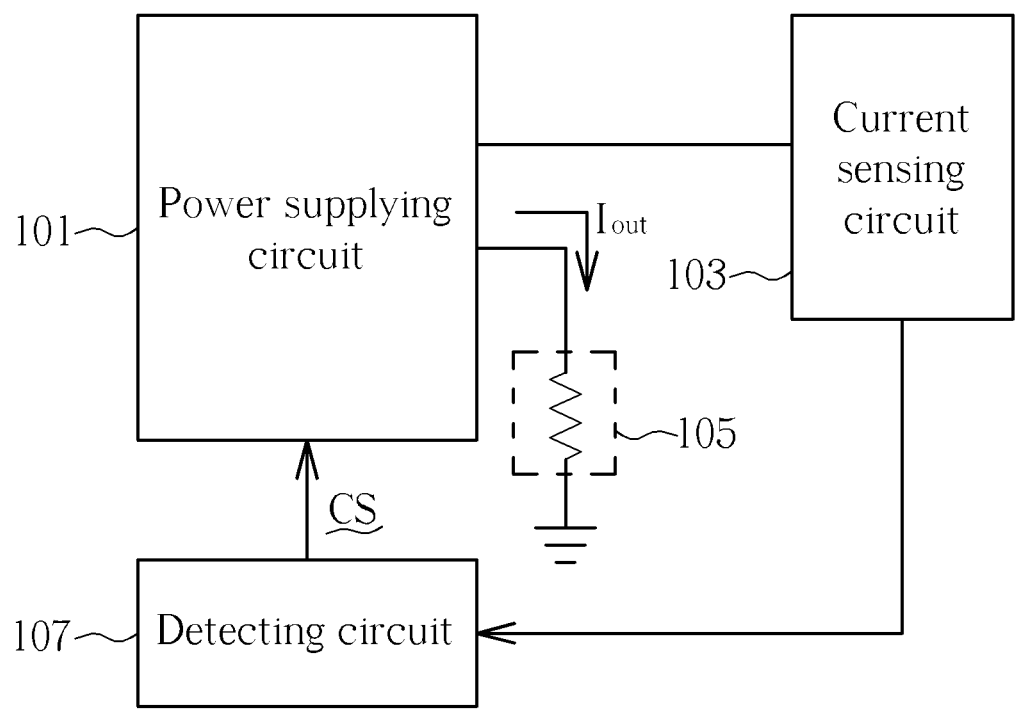
FIG. 1 is a prior art circuit diagram, which utilizes a power providing circuit to provide an output current to a loading.
Figure 2:
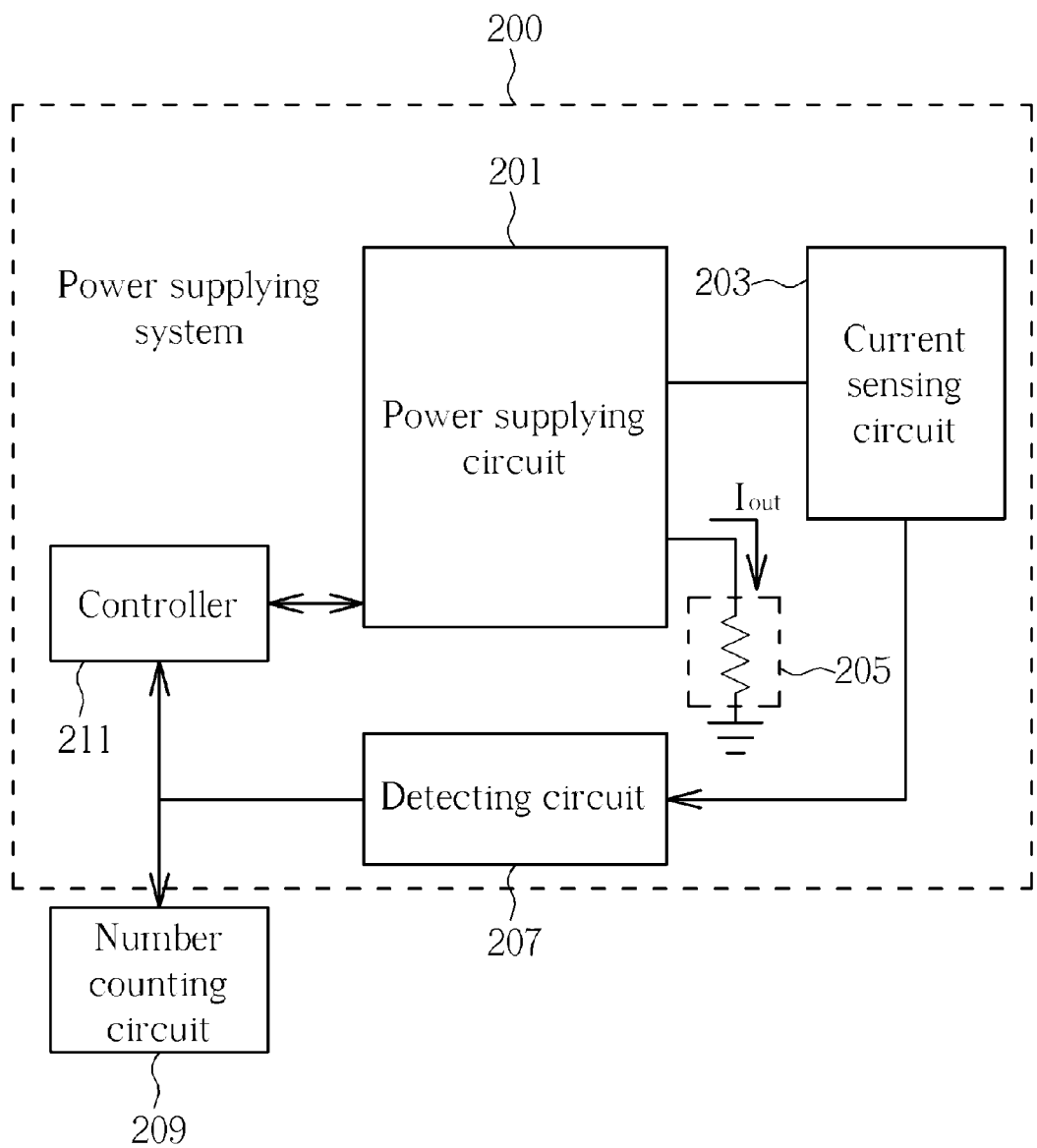
FIG. 2 is a circuit diagram illustrating a current providing system according to an embodiment of the present invention.

FIG. 2 is a circuit diagram illustrating a current providing system 200 according to an embodiment of the present invention. As shown in FIG. 2, the current providing system 200 also includes a power supplying circuit 201, a current sensing circuit 203 and a detecting circuit 207. Additionally, the current providing system 200 further includes a number counting circuit 209 and a controller 211. The power supplying circuit 201 serves to provide an output current $I_{out}$ to the loading 205. The current sensing circuit 203 detects a current value of the output current and provides this information to the detecting circuit 207. The detecting circuit 207 thereby determines if the output current $I_{out}$ is more than a current threshold value. The number counting circuit 209 computes a number that the current value of the output current $I_{out}$ is larger than the threshold current value. The controller 211 determines if the number that the output current is more than a current threshold value is larger or equal to a predetermined number. The power supplying circuit 201 is controlled to decrease the output current $I_{out}$ to a predetermined current value if the number is larger or equal to the predetermined number. That is, one of the concepts of the present application is utilizing the number counting circuit 209 to count the number that the output current $I_{out}$ is larger than a current threshold value. The number can be limited to "a number in a specific time period", such as the number in one second. If the number is larger than a predetermined number, the output current $I_{out}$ is decreased to a predetermined current value to protect the power supplying circuit 201. Such detecting operation can be continuously performed. Alternatively, it can be designed that the detecting operation is performed for a period of time and then stopped for a period of time and then starts again. By this way, the output current $I_{out}$ can be decreased only when the number that the output current is more than a current threshold value is larger than a predetermined vale, thereby the prior art issue that the value of the output current is misjudged due to noise or other reasons can be avoided.

In one embodiment, the number counting circuit 201 can be a counter. The operation of the current providing system 200 can be shown as the flow chart shown in FIG. 3, which includes the following steps:

Step 301

Start the current providing system, and set the counter value to 0.

Step 303

Detect if a current value of the output current is larger than a threshold current value. If yes, go to step 307. If not, go to step 305.

Step 305

The power supplying circuit normally operates. That is, the output current is normally changed based on the change of the loading.

Step 307

Count up by 1.

Step 309

Determine if the counter value is larger than a predetermined counter value. If yes, go to step 311. If not, go to step 317.

Step 311

Decrease the output current to a predetermined value (in this embodiment, decrease to 0).

Step 313

Control the power supplying circuit to enter a shutdown mode.

Step 315

Control the power supplying circuit to enter a sleep mode (or called a standby mode), until enters the step 301 again to turn on the circuit.

Step 317

Control a current value of the output current to be equal to or less than the threshold current value.

Step 319

Control the power supplying circuit to enter a current-limiting mode.

Step 321

Determine if the counting total number is less than the threshold counter value, which can be a constant value. If yes, go back to the step 303. If not, go back to the step 323.

It should be noted that, the counter value in the step 309 and the counting total number in the step 321 are different parameters, the predetermined counter value in the step 309 and the threshold counter value in the step 321 are different.

The predetermined counter value in the step 309 is utilized to determine if the number that the output current is more than a current threshold value is large enough such that it can be determined that the output current is actually larger than a current threshold value, rather than affected by noise.

Since the detecting frequency for detecting whether the output current is larger than the threshold current is already known, a counting total number in a predetermined period can be acquired. The purpose of the step 321 is: if the occurring that the output current is larger than the threshold current is not obvious in the predetermined time period, it means that over-current does not frequently occur in the predetermined time period. That is, if the counting total number is not larger than a threshold counting value, the counter value is still counted by the number that the output current is more than a current threshold value. Oppositely, if the counting total number is larger than a threshold counter value, the counter value is reset to 0, then the counter value is counted again by the number that the output current is more than a current threshold value. For example, the predetermined counter value can be set to 500, and the threshold counter value is set to 1000. The counter value is reset to 0 if the counting total number reaches 1000 but the counter value does not reach 500, and the counter value is recounted by the number that the output current is more than a current threshold value.

Step 323

Reset the counter value to be 0, then back to step 303.

Figure 3:
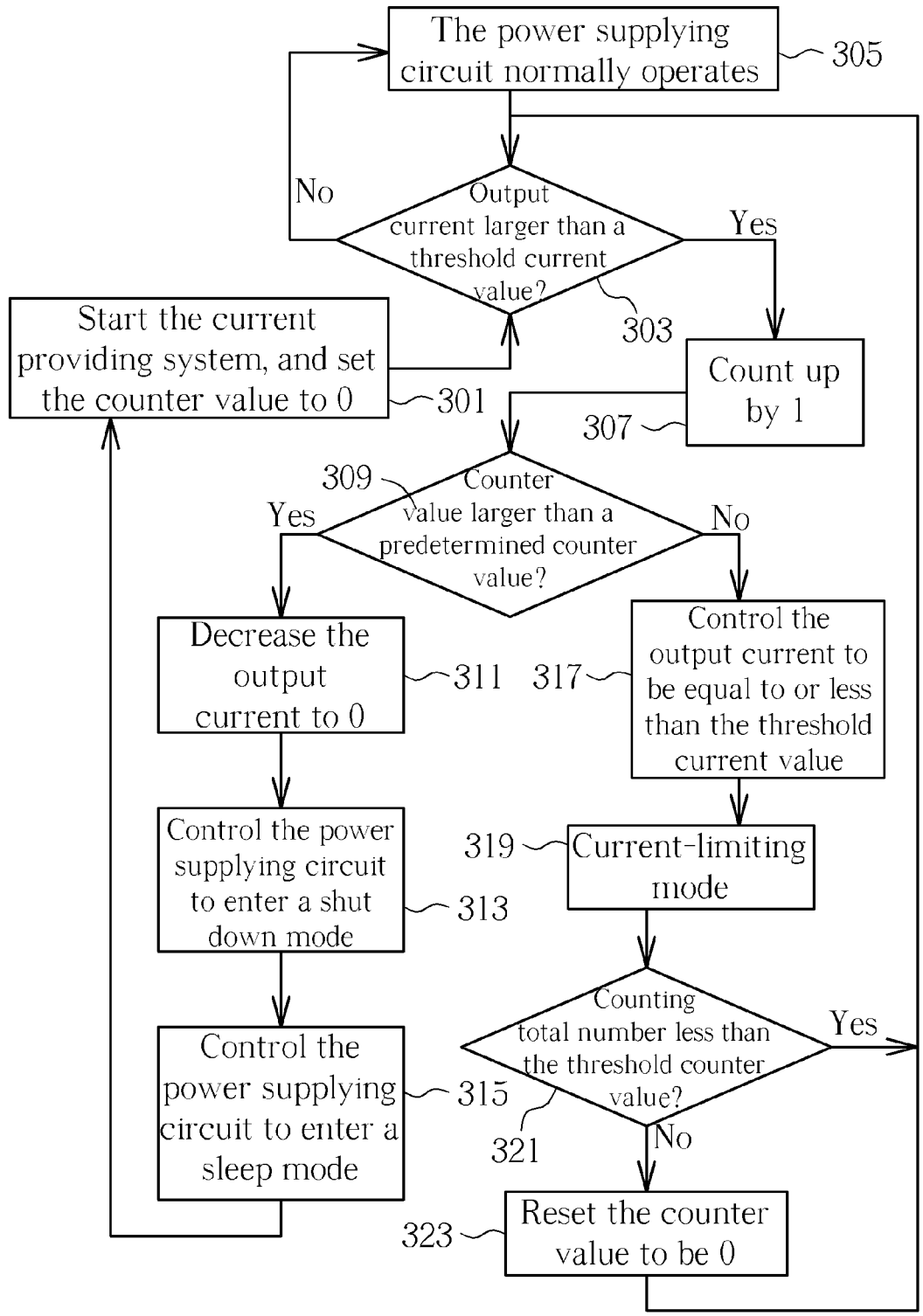
FIG. 3 is a schematic diagram illustrating the operation of the current providing system shown in FIG. 2.

It should be noted that the flow chart shown in FIG. 3 is only for example but does not mean to limit the present invention. As described above, other types of number counting circuits can be utilized to substitute the counter to count the number that the output current is more than a current threshold value. Besides, the initial counter value in the step 301 can be set to another value besides 0. Also, the step 307 can increase or decrease the counter value, and then computes the number that the output current is more than a current threshold value according to the difference between the counter value and the initial counter value. Such variation should also fall in the scope of the present application.

Moreover, a method for dynamically adjusting the predetermined counter value is also provided in the present application, which adjusts the predetermined counter value according to a frequency that the output current is more than a current threshold value. That is, if the number that the output current is more than a current threshold value is abnormally large, the reason for such issue may be that the predetermined counter value is too small, thus the predetermined counter value can be adjusted to a larger value. Oppositely, if the number that the output current is more than a current threshold value is abnormally small, the reason for such issue may be that the predetermined counter value is too larger, thus the predetermined counter value can be adjusted to a smaller value. For example, if the number that the output current is more than a current threshold value reaches 1000 times/sec, the reason for such error may be the predetermined counter value is too small such that a frequency that the output current is more than a current threshold value is abnormally high, thus the predetermined counter value is increased. Oppositely, if it is supposed that a situation the output current is more than a current threshold value should occur, but it does not, the reason for such error may be the predetermined counter value is too large, thus the predetermined counter value is decreased. In the embodiment shown in FIG. 2, one method to perform such function is adding corresponding firmware to the controller 209.

Figure 4:
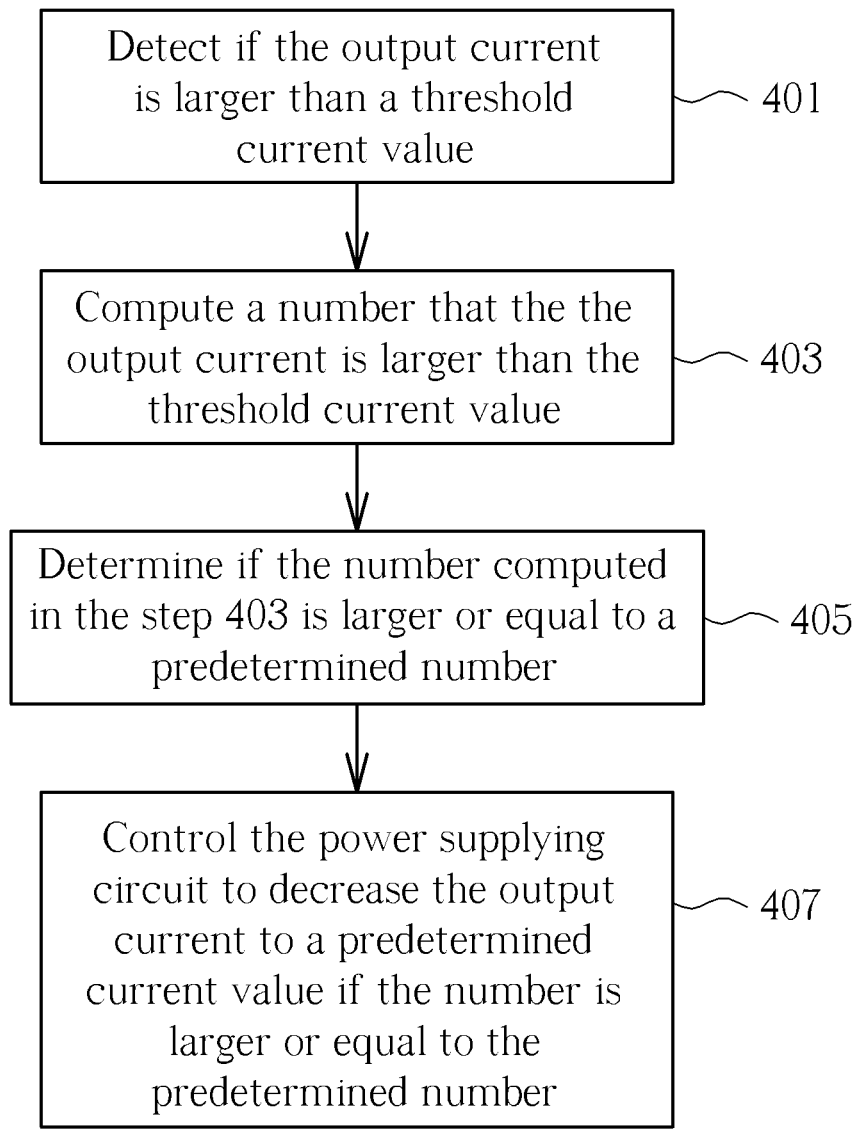
FIG. 4 is a flow chart illustrating a current providing method according to one embodiment of the present application.

In view of above-mentioned description, the flow cart shown in FIG. 3 can be summarized as the flow chart shown in FIG. 4.

FIG. 4 is a flow chart illustrating a current providing method according to one embodiment of the present application. The flow method includes:

Step 401

Detect if a current value of the output current $I_{out}$ is larger than a threshold current value.

Step 403

Compute a number that the current value of the output current is larger than the threshold current value.

Step 405

Determine if the number computed in the step 403 is larger or equal to a predetermined number. The step can be performed by a counter, but also can be implemented by other kinds of circuits.

Step 407

Control the power supplying circuit to decrease the output current to a predetermined current value if the number is larger or equal to the predetermined number.

Figure 5:
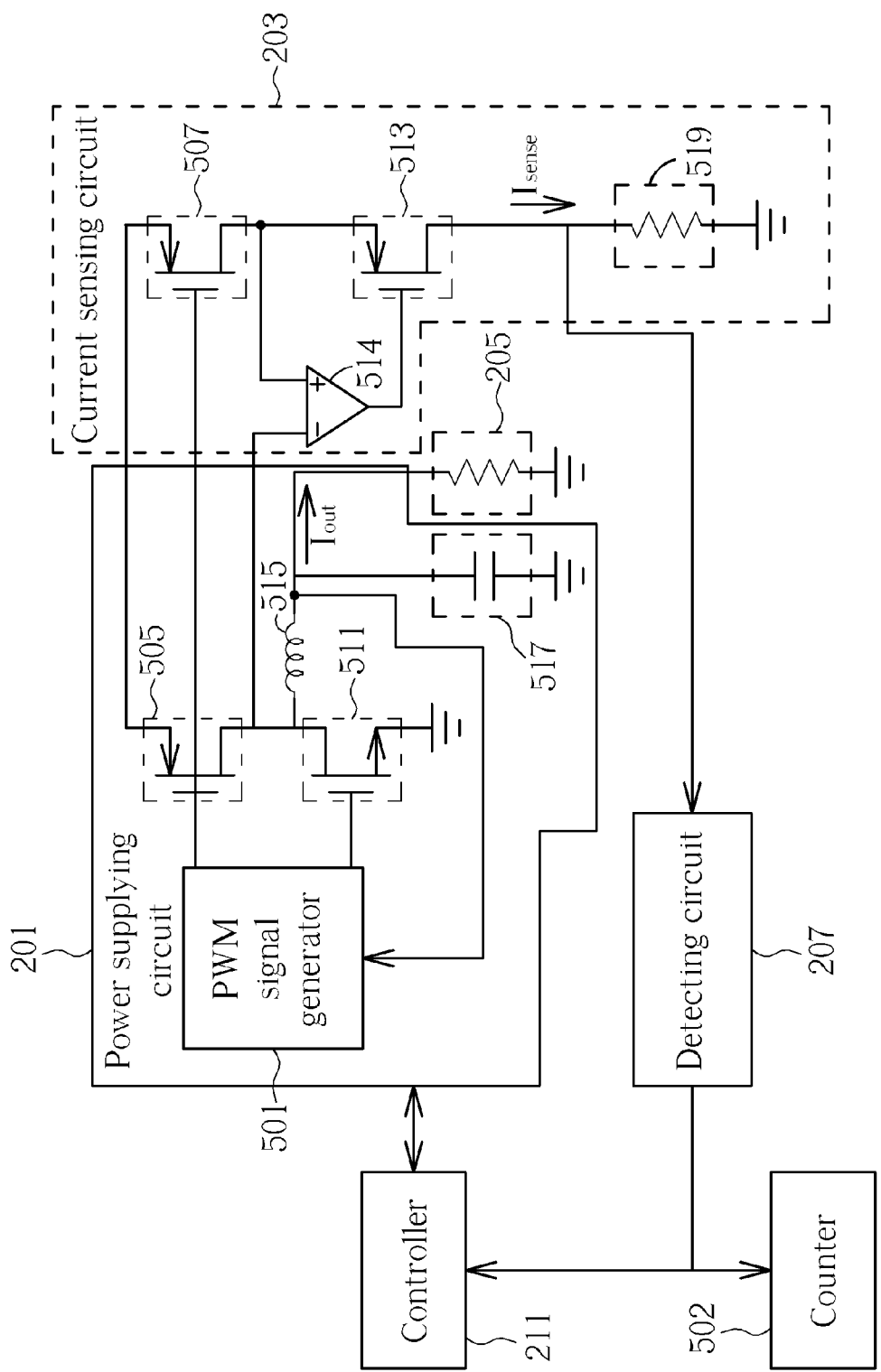
FIG. 5 is an example for the detail structure of the embodiment shown in FIG. 2.

FIG. 5 is an example for the detail structure of the embodiment shown in FIG. 2. In this embodiment, the power supplying circuit 201 includes a PWM (Pulse Width Modulation) signal generator 501, transistors 505, 511, a conductance 515 and a capacitor 517. The current sensing circuit 203 includes transistors 507, 513, a comparator 514 and a resistor 519. The number counting circuit 209 shown in FIG. 2 can be implemented by the counter 502. In this embodiment, the PWM signal generator 501 serves to control the operations of transistors 505 and 511, to charger and discharge the conductance 515 and the capacitor 517. A value of the output current $I_{out}$ generated by the conductance 515 will be transmitted to the PWM signal generator 501, which controls the transistors 505 and 511 according to the value of the output current $I_{out}$, such that a desired output current $I_{out}$ is generated to the loading 205. After that, the output current $I_{out}$ will be mirrored to a side of the transistors 507 and 513 to generate the current $I_{sense}$. Accordingly, the detecting circuit 207 can detect the current $I_{sense}$ to acquire a value of the output current $I_{out}$. The comparator 513 serves to compare the currents at the side of transistors 507/509, and the side of transistors 505/511, such that the two sides can include the same currents. In one embodiment, the PWM signal generator receives a control clock signal. The frequency of the control clock signal is the same as the operational frequency for operations of the current sensing circuit 203 and the detecting circuit 207, such that the circuits can be synchronized and easy to be controlled.

It should be noted that the circuit diagram of FIG. 5 is only for example. Persons skilled in the art can change the circuit structure of the power supplying circuit 201 and the current sensing circuit 203, to reach the same function.

In view of above-mentioned embodiments, the prior issue that the power supplying circuit is wrongly turned off due to misjudging the output current can be avoided. Additionally, the accurate timing for turning off the power supplying circuit can be acquired via dynamically changing the predetermined counter value.

Those skilled in the art will readily observe that numerous modifications and alterations of the device and method may be made while retaining the teachings of the invention.

What is claimed is:

1. A current providing method, utilized to a power supplying circuit, which provides an output current to a loading, the current providing method comprising:
    detecting if a current value of the output current is larger than a threshold current value;
    computing a number that the current value of the output current is larger than the threshold current value;
    determining if the number is larger or equal to a predetermined number; and
    controlling the power supplying circuit to decrease the output current to a predetermined current value if the number is larger or equal to the predetermined number.

2. The current providing method of claim 1, further comprising:
    controlling the power supplying circuit to continuously generate the output current with a current value equal to or less than the threshold current value if the number is smaller than the predetermined value.

3. The current providing method of claim 1, further comprising:
    providing a counter value;
    wherein the step of computing the number that the current value of the output current is larger than the threshold current value includes counting up the counter value when the output current is larger than the threshold current value, where the number is corresponding to the counter value after counting up.

4. The current providing method of claim 3, further comprising:
    counting a counting total number;
    determining if the counting total number is larger than or equal to a threshold counting value; and
    resetting the counter value to be 0, if the counting total number is larger than or equal to the threshold counting value.

5. The current providing method of claim 1, wherein the predetermined current value is 0.

6. The current providing method of claim 5, further comprising:
    controlling the power supplying circuit to start supplying the output current after the output current is decreased to 0 after a predetermined time period.

7. The current providing method of claim 1, further comprising:
    computing a frequency that the output current is larger than the threshold current value; and
    adjusting the predetermined number according to the frequency.

8. The current providing method of claim 1, further comprising utilizing a PWM signal generator to generate the output current, wherein the PWM signal generator receives a control clock signal, where the frequency of the control clock signal is the same as the operational frequency of the step for detecting if a current value of the output current is larger than or equal to the threshold current value.

9. A current providing system, comprising:
    a power supplying circuit, for providing an output current to a loading;
    a current sensing circuit, for detecting a current value of the output current;
    a detecting circuit, for determining if a current value of the output current is larger than a threshold current value;
    a number counting circuit, for computing a number that the current value of the output current is larger than the threshold current value; and
    a controller, for determining if the number is larger or equal to a predetermined number and for controlling the power supplying circuit to decrease the output current to a predetermined current value if the number is larger or equal to the predetermined number.

10. The current providing system of claim 9, wherein the controller controls the power supplying circuit to continuously generate the output current with a current value equal to less than the threshold current value if the number is smaller than the predetermined value.

11. The current providing system of claim 9, wherein the number counting circuit is a counter, where the counter value is changed by the controller, when the output current is larger than the threshold current value, wherein the controller determines if the number is larger or equal to the predetermined number according to the counter value after changed.

12. The current providing system of claim 11, wherein the controller determines if a counting total number is larger than or equal to a threshold counting value; and resets the counter value to be 0, if the counting total number is larger or equal to the threshold counting value.

13. The current providing system of claim 9, wherein the predetermined current value is 0.

14. The current providing system of claim 13, wherein the controller controls the power supplying circuit to start supplying the output current after the output current is decreased to 0 after a predetermined time period.

15. The current providing system of claim 9, wherein the controller computes a frequency that the output current is larger than the threshold current value; and adjusts the predetermined number according to the frequency.

16. The current providing system of claim 9, wherein the power supplying circuit includes a PWM signal generator to generate the output current, where the PWM signal generator receives a control clock signal, wherein the frequency of the control clock signal is the same as the operational frequency of the current sensing circuit and the detecting circuit.

* * * * *